United States Patent
Yano

(10) Patent No.: US 9,266,027 B1
(45) Date of Patent: Feb. 23, 2016

(54) SYSTEM AND METHOD FOR PROVIDING AN ENHANCED MARKETING, SALE, OR ORDER FULFILLMENT EXPERIENCE RELATED TO ACTION FIGURES OR ACTION FIGURE ACCESSORIES HAVING CORRESPONDING VIRTUAL COUNTERPARTS

(71) Applicant: Jumo Inc., Camden, DE (US)

(72) Inventor: Keiichi Yano, Tokyo (JP)

(73) Assignee: Jumo, Inc., Camden, DE (US)

( * ) Notice: Subject to any disclaimer, the term of this patent is extended or adjusted under 35 U.S.C. 154(b) by 0 days.

(21) Appl. No.: 14/622,354

(22) Filed: Feb. 13, 2015

(51) Int. Cl.
| | |
|---|---|
| A63F 13/10 | (2006.01) |
| A63F 13/792 | (2014.01) |
| G06Q 30/02 | (2012.01) |
| G06Q 20/12 | (2012.01) |
| A63F 13/61 | (2014.01) |

(52) U.S. Cl.
CPC ............... *A63F 13/792* (2014.09); *A63F 13/61* (2014.09); *G06Q 20/123* (2013.01); *G06Q 30/0269* (2013.01)

(58) Field of Classification Search
USPC ...................................................... 463/25, 30
See application file for complete search history.

(56) References Cited

U.S. PATENT DOCUMENTS

| | | | | |
|---|---|---|---|---|
| 5,766,077 | A | 6/1998 | Hongo | 463/30 |
| 6,012,961 | A | 1/2000 | Sharpe, III et al. | 446/298 |
| 6,159,101 | A | 12/2000 | Simpson | 463/46 |
| 6,290,565 | B1 | 9/2001 | Galyean, III et al. | 446/99 |
| 6,354,947 | B1 | 3/2002 | Dobrusskin et al. | 463/43 |
| 6,773,325 | B1 | 8/2004 | Mawle et al. | 446/175 |
| 7,066,781 | B2 | 6/2006 | Weston | 446/268 |
| 7,502,759 | B2 | 3/2009 | Hannigan et al. | 705/51 |
| 7,610,233 | B1 * | 10/2009 | Leong | G06Q 10/087 705/26.3 |
| 7,828,295 | B2 | 11/2010 | Matsumoto et al. | 273/238 |
| 7,843,471 | B2 | 11/2010 | Doan et al. | 345/633 |
| 7,862,428 | B2 | 1/2011 | Borge | 463/29 |
| 8,257,157 | B2 | 9/2012 | Polchin | 463/9 |
| 8,585,497 | B2 | 11/2013 | Borge | 463/29 |
| 8,595,811 | B2 | 11/2013 | Johnson et al. | 726/9 |
| 8,602,857 | B2 | 12/2013 | Morichau-Beauchant et al. | 463/6 |
| 8,636,588 | B2 | 1/2014 | Borge | 463/29 |
| 8,734,242 | B2 | 5/2014 | Borge | 463/29 |
| 9,205,336 | B1 | 12/2015 | Yano | |
| 2003/0027636 | A1 | 2/2003 | Covannon et al. | 463/42 |
| 2005/0059483 | A1 | 3/2005 | Borge | 463/29 |
| 2005/0266920 | A1 * | 12/2005 | Kaku | A63F 13/10 463/31 |

(Continued)

OTHER PUBLICATIONS

U.S. Appl. No. 14/645,228, a non-Final Office Action, mailed May 22, 2015, 45 pages.

(Continued)

*Primary Examiner* — Pierre E Elisca
(74) *Attorney, Agent, or Firm* — Sheppard Mullin Richter & Hampton LLP

(57) ABSTRACT

In certain implementations, user performance related to a virtual environment may be utilized to provide a targeted presentation of action —figures, action figure accessories, or other items (e.g., services, products, etc.) available for purchase in an online marketplace. As an example, performance indicator information related to performance of a user of the virtual environment may be obtained. One or more of the action figures or action figure accessories may be selected based on the performance indicator information. The selected action figures or action figure accessories may be presented to the user in the online marketplace.

21 Claims, 10 Drawing Sheets

(56) References Cited

U.S. PATENT DOCUMENTS

| | | | |
|---|---|---|---|
| 2006/0070029 A1 | 3/2006 | Laborczfalvi et al. | 717/120 |
| 2006/0084362 A1 | 4/2006 | Ghaly | 446/484 |
| 2006/0273909 A1 | 12/2006 | Heiman et al. | 340/572.7 |
| 2007/0015588 A1 | 1/2007 | Matsumoto et al. | 463/43 |
| 2007/0197297 A1 | 8/2007 | Witchey | 463/42 |
| 2009/0053970 A1 | 2/2009 | Borge | 446/268 |
| 2009/0054155 A1 | 2/2009 | Borge | 463/42 |
| 2009/0098792 A1 | 4/2009 | Cheng et al. | 446/219 |
| 2009/0158210 A1 | 6/2009 | Cheng et al. | 715/810 |
| 2010/0088650 A1 | 4/2010 | Kaltenbach et al. | 715/849 |
| 2010/0151940 A1 | 6/2010 | Borge | 463/29 |
| 2011/0014984 A1 | 1/2011 | Penman et al. | 463/42 |
| 2011/0047600 A1 | 2/2011 | Johnson et al. | 726/4 |
| 2011/0124264 A1 | 5/2011 | Garbos | 446/147 |
| 2012/0295703 A1 | 11/2012 | Reiche et al. | 463/31 |
| 2013/0288563 A1 | 10/2013 | Zheng et al. | 446/268 |
| 2013/0307848 A1 | 11/2013 | Tena et al. | 345/420 |
| 2014/0030955 A1 | 1/2014 | Smetanin et al. | 446/268 |
| 2014/0088750 A1 | 3/2014 | Sharma et al. | 700/118 |
| 2014/0114630 A1 | 4/2014 | Brave | 703/6 |
| 2014/0121008 A1 | 5/2014 | Canessa | 463/29 |
| 2014/0273717 A1 | 9/2014 | Judkins et al. | 446/175 |
| 2014/0273721 A1 | 9/2014 | Katan et al. | 446/268 |
| 2014/0357373 A1 | 12/2014 | Barney et al. | 463/37 |
| 2015/0174479 A1 | 6/2015 | Reiche et al. | |

OTHER PUBLICATIONS

U.S. Appl. No. 14/622,287, a non-Final Office Action, mailed Jun. 24, 2015, 20 pages.

U.S. Appl. No. 14/622,386, a non-Final Office Action, mailed Jul. 6, 2015, 14 pages.

U.S. Appl. No. 14/622,321, a non-Final Office Action, mailed Jul. 24, 2015, 10 pages.

U.S. Appl. No. 14/636,115, a Notice of Allowance, mailed Oct. 7, 2015, 9 pages.

U.S. Appl. No. 14/622,386, a Notice of Allowance, mailed Nov. 30, 2015, 9 pages.

U.S. Appl. No. 14/622,321, a non-final Office Action, mailed Jan. 6, 2016, 12 pages.

U.S. Appl. No. 14/622,287, a Final Office Action, mailed Jan. 7, 2016, 18 pages.

\* cited by examiner

╭─ 302

Welcome User X! Here are Recommendations for You!
When you purchase an action figure or accessory, you may have a chance to obtain a rare version of the action figure or accessory. The rare action figure or accessory version will enable you to activate and add a rare version of the corresponding virtual counterpart to your virtual collection!

*TODAY ONLY SPECIAL! If you purchase an action figure or accessory today, you will have a 50% increased chance of obtaining a rare version.*

Action Figures:

| Description of Action Figure 304a | Description of Action Figure 304b | Description of Action Figure 304c | Description of Action Figure 304d | Description of Action Figure 304e |
|---|---|---|---|---|

Action Figures Accessories:

| Description of Action Figure Accessory 306a | Description of Action Figure Accessory 306b | Description of Action Figure Accessory 306c | Description of Action Figure Accessory 306d | Description of Action Figure Accessory 306e |
|---|---|---|---|---|

FIG. 3

SYSTEM AND METHOD FOR PROVIDING AN ENHANCED MARKETING, SALE, OR ORDER FULFILLMENT EXPERIENCE RELATED TO ACTION FIGURES OR ACTION FIGURE ACCESSORIES HAVING CORRESPONDING VIRTUAL COUNTERPARTS

CROSS-REFERENCE TO RELATED APPLICATIONS

This application is related to following, co-pending U.S. utility patent applications, filed on even date herewith: (1) U.S. patent application Ser. No. 14/622,287, entitled "SYSTEM AND METHOD FOR PRESENTING A VIRTUAL COUNTERPART OF AN ACTION FIGURE BASED ON ACTION FIGURE STATE INFORMATION," (2) U.S. patent application Ser. No. 14/622,321, entitled "SYSTEM AND METHOD FOR PROVIDING STATE INFORMATION OF AN ACTION FIGURE," and (3) U.S. patent application Ser. No. 14/622,386, entitled "SYSTEM AND METHOD FOR PROVIDING RELEVANT NOTIFICATIONS VIA AN ACTION FIGURE," each of which is hereby incorporated by reference herein in its entirety.

FIELD OF THE INVENTION

The invention relates to providing interactive action figures or action figure accessories that have corresponding virtual counterparts in a virtual environment, and more particularly to a system and method of providing an enhanced marketing, sale, or order fulfillment experience related to action figures or action figure accessories that have corresponding virtual counterparts in a virtual environment.

BACKGROUND OF THE INVENTION

In recent years, a number of video game/toy hybrid systems have emerged where figurines of movie, comic, or story characters can "come to life" in a video game. As an example, typical video game/toy hybrid systems enable a player to "import" a character represented by a figurine into the video game by placing the figurine on a portal device attached to a game console. Each game session may require the player to import the character (via the placement of the figurine) to utilize the character to accomplish various tasks in the game during the session. From the perspective of the player, the figurine and the character may become "synonymous" with one another as the player continues to use the figurine to access the character in the video game. As the character grows in-game (e.g., levels up) and obtains new abilities and special powers, the value of the figurine to the player may also increase—further adding to the collectability value of the figurine.

While these video game/toy hybrid systems are distinct from their traditional non-hybrid counterparts, the marketing, sale, or order fulfillment experience with respect to video games or toys of the hybrid systems are generally similar to the marketing, sale, or order fulfillment experience of traditional video games or toys. For example, recommendation systems providing recommendations of video games or toys of the hybrid system typically utilize the same techniques as the techniques utilized to provide recommendations of traditional video games or toys. As such, typical recommendation systems fail to take advantage of aspects unique to video game/toy hybrid systems to personalize recommendations of sale items for users. These and other drawbacks exist.

SUMMARY OF THE INVENTION

The invention addressing these and other drawbacks relates to methods, apparatuses, and/or systems for providing an enhanced marketing, sale, or order fulfillment experience related to action figures or action figure accessories that have corresponding virtual counterparts in a virtual environment. As used herein, an action figure may comprise a figurine, made of plastic or other materials, having one or more moveable parts (e.g., moveable appendages or other moveable parts) that allow the action figure to exhibit various poses. An action figure accessory may comprise one or more physical objects that modify or supplement the functionality or appearance of an action figure (e.g., to make the action figure more useful, versatile, or attractive, to change the appearance of the action figure, etc.). A virtual environment may comprise a virtual space, a game space, a virtual universe, or other virtual environment.

In accordance with one aspect of the invention, a user may utilize one or more virtual counterparts of action figures or accessories in a virtual environment to interact with other virtual counterparts, automated virtual character entities, or the virtual environment to accomplish one or more objectives in the virtual environment. The user's performance with respect to the objectives may be monitored and utilized to generate performance indicator information associated with the user. The performance indicator information may then be utilized to select one or more action figures, accessories, or other items (e.g., services or other products) as recommended items to be presented to the user for purchase in an online marketplace. In this way, a user's performance with respect to a virtual environment (e.g., a game space, a virtual universe, etc.) may be utilized to personalize recommendations of action figures or accessories having corresponding virtual counterparts in the virtual environment.

As an example, the performance indicator information may identify one or more tasks completed by the user, one or more tasks that have not been completed by the user, a percentage of completed/non-completed tasks related to an objective, one or more objectives achieved by the user, one or more objectives that have not been achieved by the user, a percentage of achieved/non-achieved objectives, one or more performance scores associated with tasks or objectives, or other performance indicators. In one use case, action figures or accessories may be selected for the user based on whether the user has satisfied certain conditions, such as whether the user has completed certain tasks or objectives, whether the user has completed a threshold percentage of tasks related to an objective, or other conditions related to the user's performance in the virtual environment. An action figure or accessory may not be selected as a recommended item for the user if, for example, the user has not satisfied a performance-related condition for obtaining a virtual counterpart that represents the action figure or accessory in the virtual environment.

In another use case, action figures or accessories may be selected for the user based on the level of benefit of the action figures or accessories for the user. An action figure or accessory may be determined to be beneficial for the user if, for example, the user obtains a virtual counterpart through the action figure or accessory that enables the user to more easily perform an uncompleted task or redo a completed task (e.g., compared to performing or redoing a task with the user's current set of virtual counterparts without the virtual counterpart obtained through the action figure or accessory). Based on such determination, the action figure or accessory may be selected as a recommended item to be presented to the user for purchase in an online marketplace.

In an implementation, a purchase of an action figure or accessory may comprise a chance-based purchase of a version of the action figure or accessory. As an example, responsive to an action figure or accessory being purchased by a user, a randomly-selected version of the action figure or accessory may be provided for delivery to the user. The randomly-selected version of the action figure or accessory may have a corresponding virtual counterpart in a virtual environment. As such, the virtual counterpart of the randomly-selected version may be provided to the user in the virtual environment (e.g., immediately after the purchase of the action figure or accessory, upon activation of the action figure or accessory, etc.).

In an implementation, a particular version of an action figure or accessory (e.g., a rare version) may have physical characteristics (e.g., color, shape, or other characteristics) that are different from the physical characteristics of another version of the action figure or accessory (e.g., a common version). The particular version of the action figure or accessory may alternatively or additionally comprise digital parameter augmentations (e.g., one or more indicators stored in memory of the action figure or accessory to indicate the differences of the particular version) not available on the other version of the action figure or accessory. As an example, upon the particular version of the action figure or accessory being activated by a user, a virtual counterpart of the action figure or accessory that corresponds to the particular version may be identified based on the digital parameter augmentations and provided to the user in a virtual environment.

In an implementation, responsive to an action figure or accessory being purchased by a user, a temporary virtual object may be provided to the user such that the temporary virtual object is available for use by the user in a virtual environment. The temporary virtual object may comprise a virtual counterpart of the action figure or accessory, a substitute for the virtual counterpart, or other temporary virtual object. The temporary virtual object may be assigned a time of expiration such that use of the temporary virtual object by the user in the virtual environment is limited based on the time of expiration. As an example, the time of expiration may be assigned based on order fulfillment information, such as a current order fulfillment stage, an estimated time remaining until a particular order fulfillment stage, a location of the action figure or accessory, or other information. In one scenario, when the time of expiration is reached, one or more aspects of the temporary virtual object may be disabled such that those aspects are no longer available for use by the user in the virtual environment. In another scenario, when the time of expiration is reached, the temporary virtual object may be disabled such that the temporary virtual object (and aspects of the temporary virtual object) is no longer available for use by the user in the virtual environment.

In an implementation, an indication of progress of delivery of an action figure or accessory that has been purchased by a user may be presented in a virtual environment (e.g., in which a virtual counterpart of the action figure or accessory is to be provided). The presentation of the indication of the delivery progress may, for example, be based on order fulfillment information related to the delivery of the action figure or accessory, such as a current order fulfillment stage, an estimated time remaining until a particular order fulfillment stage, a location of the action figure or accessory, or other information. In some implementations, the presentation of the indication of the delivery progress may comprise a presentation of a virtual object (e.g., a virtual character entity or other virtual object) in the virtual environment delivering or preparing for delivery a virtual counterpart of the action figure or accessory.

In an implementation, an online marketplace may provide recommended items (selected based on performance indicator information or other criteria) or other items for sale, and may be updated with new items for sale (e.g., as they become available for use with a virtual environment in which a virtual counterpart of the item exists). In an implementation, a "digital store front" accessible via a user device (e.g., residing on the user device, part of an application of the user device, etc.) may provide a user with access to the online marketplace, for example, enabling the user to browse items for sales (e.g., action figures, action figure accessories, etc.) and related information (e.g., pricing information, item details, etc.), purchase one or more items, view information related to fulfillment of orders, or perform other actions. Upon purchase of an item, fulfillment of the purchase may be automated.

In an implementation, the online marketplace may be managed in-house or by one or more third parties. The entity managing the online marketplace may manage customer information (e.g., customer names, shipping information, billing information, payment information, etc.), inventory information (e.g., availability of action figures, action figure accessories, or other items for sale), pricing information (e.g., sale prices of items), purchase order information (e.g., pending order information, purchase history information, etc.), order fulfillment information, or other information related to marketing, sale, or order fulfillment of items. Management of the foregoing information may be performed via a management computer system of the entity managing the online marketplace or other associated entity.

Various other aspects, features, and advantages of the invention will be apparent through the detailed description of the invention and the drawings attached hereto. It is also to be understood that both the foregoing general description and the following detailed description are exemplary and not restrictive of the scope of the invention. As used in the specification and in the claims, the singular forms of "a", "an", and "the" include plural referents unless the context clearly dictates otherwise. In addition, as used in the specification and the claims, the term "or" means "and/or" unless the context clearly dictates otherwise.

BRIEF DESCRIPTION OF THE DRAWINGS

FIG. 3 is an exemplary illustration of an online marketplace providing a targeted presentation of action figures or action figure accessories available for purchase, in accordance with an aspect of the invention.

DETAILED DESCRIPTION OF THE INVENTION

In the following description, for the purposes of explanation, numerous specific details are set forth in order to provide a thorough understanding of the implementations of the invention. It will be appreciated, however, by those having skill in the art that the implementations of the invention may be practiced without these specific details or with an equivalent arrangement. In other instances, well-known structures and devices are shown in block diagram form in order to avoid unnecessarily obscuring the implementations of the invention.

Exemplary System Description

Figure 1:
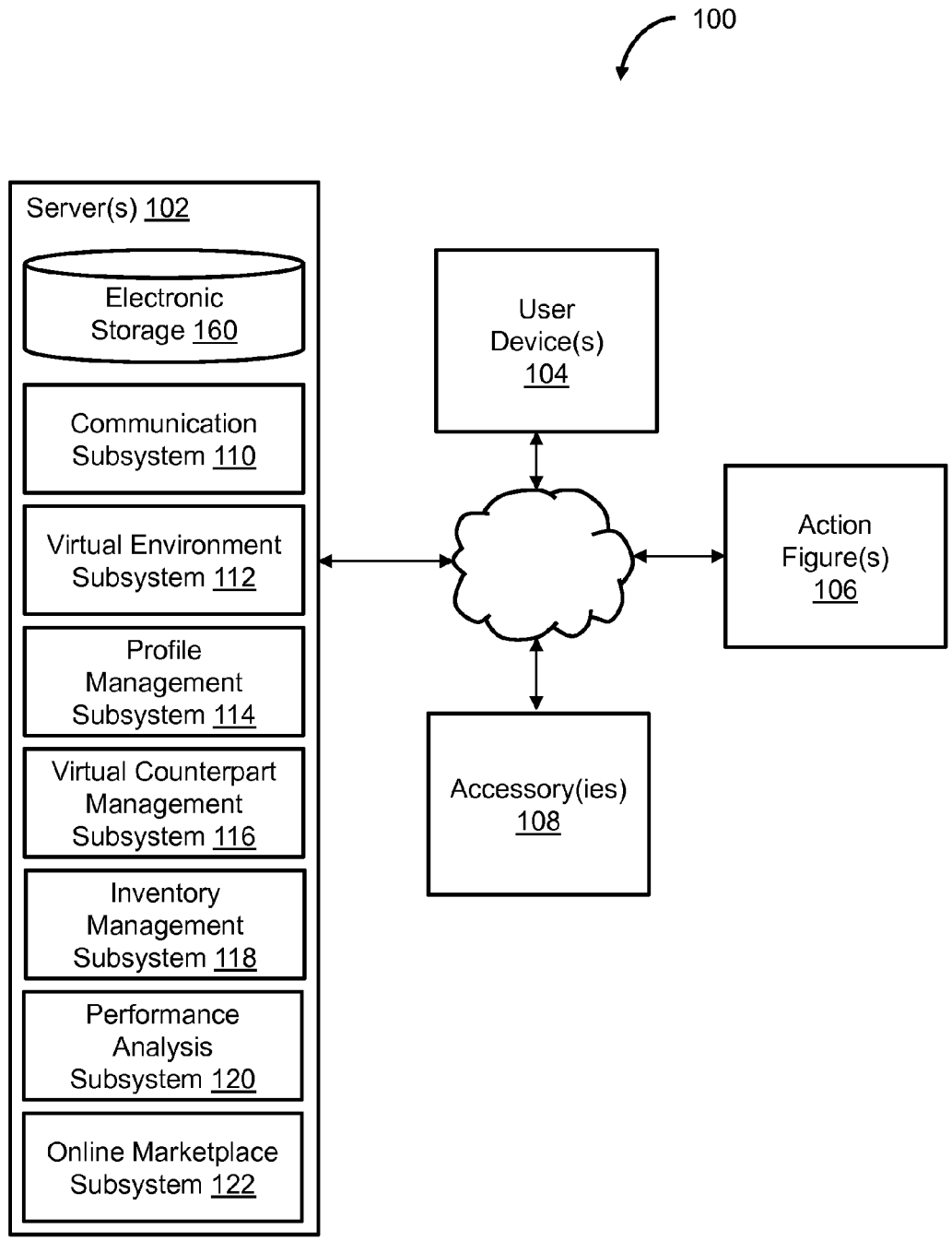
FIG. 1 is an exemplary illustration of a system for providing an enhanced marketing, sale, or order fulfillment experience related to action figures or action figure accessories that have corresponding virtual counterparts in a virtual environment, in accordance with an aspect of the invention.

FIG. 1 is an exemplary illustration of a system 100 for providing an enhanced marketing, sale, or order fulfillment experience related to action figures or action figure accessories that have corresponding virtual counterparts in a virtual environment, in accordance with an aspect of the invention. As shown in FIG. 1, system 100 may comprise server 102 (or multiple servers 102). Server 102 may comprise communication subsystem 110, virtual environment subsystem 112, profile management subsystem 114, virtual counterpart management subsystem 116, inventory management subsystem 118, performance analysis subsystem 120, online marketplace subsystem 122, or other components.

System 100 may further comprise a user device 104 (or multiple user devices 104). User device 104 may comprise any type of mobile terminal, fixed terminal, or other device. By way of example, user device 104 may comprise a desktop computer, a notebook computer, a netbook computer, a tablet computer, a smartphone, a navigation device, an electronic book device, a gaming device, or other user device. Users may, for instance, utilize one or more user devices 104 to interact with server 102, other user devices 104, action figures 106, action figure accessories 108, or other components of system 100. It should be noted that, while one or more operations are described herein as being performed by components of server 102, those operations may, in some implementations, be performed by components of user device 104.

In some implementations, user device 104 may act as an intermediary between server 102, action FIG. 106, and/or accessory 108. As an example, information may be provided from server 102 to action FIG. 106 or accessory 108 via user device 104, and information may be provided from action FIG. 106 or accessory 108 to server 102 via user device 104. In other implementations, server 102, action FIG. 106, or accessory 108 may receive information from or transmit information to one another without the need for user device 104 through one or more wired or wireless means. As such, although some implementations are described herein with respect to the use of user device 104 as an intermediary between server 102, action FIG. 106, and/or accessory 108, it is understood that (to the extent possible) receipt and transmission of information between server 102, action FIG. 106, and/or accessory 108 may be performed without the need for user device 104 as an intermediary.

In some implementations, the various computers and subsystems illustrated in FIG. 1 may comprise one or more computing devices that are programmed to perform the functions described herein. The computing devices may include one or more electronic storages (e.g., electronic storage 160, or other electric storages), one or more physical processors programmed with one or more computer program instructions, and/or other components. The computing devices may include communication lines, or ports to enable the exchange of information with a network or other computing platforms. The computing devices may include a plurality of hardware, software, and/or firmware components operating together to provide the functionality attributed herein to the servers. For example, the computing devices may be implemented by a cloud of computing platforms operating together as the computing devices.

The electronic storages may comprise non-transitory storage media that electronically stores information. The electronic storage media of the electronic storages may include one or both of system storage that is provided integrally (e.g., substantially non-removable) with the servers or removable storage that is removably connectable to the servers via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information received from the servers, information received from client computing platforms, or other information that enables the servers to function as described herein.

The processors may be programmed to provide information processing capabilities in the servers. As such, the processors may include one or more of a digital processor, an analog processor, a digital circuit designed to process information, an analog circuit designed to process information, a state machine, and/or other mechanisms for electronically processing information. In some implementations, the processors may include a plurality of processing units. These processing units may be physically located within the same device, or the processors may represent processing functionality of a plurality of devices operating in coordination. The processors may be programmed to execute computer program instructions to perform functions described herein of subsystems 110-122 or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems 110-122 described herein is for illustrative purposes, and is not intended to be limiting, as any of subsystems 110-122 may provide more or less functionality than is described. For example, one or more of subsystems 110-122 may be eliminated, and some or all of its functionality may be provided by other ones of subsystems 110-122. As another example, additional subsystems may be programmed to perform some or all of the functionality attributed herein to one of subsystems 110-122.

Attention will now be turned to a more detailed description of various implementations comprising one or more features related to providing an enhanced marketing, sale, or order fulfillment experience related to action figures or action figure accessories that have corresponding virtual counterparts in a virtual environment. It should be noted that features described herein may be implemented separately or in combination with one another.

Virtual Counterpart Presentation Based on Action Figure or Accessory Information In an implementation, action figure information obtained from an action figure may be utilized to present a virtual counterpart of the action figure in a virtual environment in which virtual counterparts of action figures interact with one another or with the virtual environment. In an implementation, action figure or accessory information may be obtained from one or more action figures or accessories. The action figure or accessory information may then be utilized to present virtual counterparts of the action figures or accessories in the virtual environment. In some implementations, presentation of virtual counterparts based on action figure or accessory information may be provided in accordance with implementations described in related co-pending U.S. patent application Ser. No. 14/622,287, filed on even date herewith entitled "SYSTEM AND METHOD FOR PRESENTING A VIRTUAL COUNTERPART OF AN ACTION FIGURE BASED ON ACTION FIGURE STATE INFORMATION," which is hereby incorporated by reference in its entirety.

In an implementation, user device 104 may detect action FIG. 106 within a short wireless communication range of user device 104. Based on the detection of action FIG. 106, user device 104 may establish a wireless connection between user device 104 and action FIG. 106. Additionally, or alternatively, user device 104 may detect one or more accessories 108, other action figures 106, or other objects within a short wireless communication range of user device 104, and establish respective wireless connections with the detected components.

As an example, if user device 104 enables wireless communication between user device 104 and the other object (e.g., action FIG. 106, accessory 108, etc.) via near field communication (NFC) technology, the other object may need to be within an NFC communication range in order for the other object to be detected and an NFC communication session to be established between user device 104 and the other object. As another example, if user device 104 enables wireless communication between user device 104 and the other object via Bluetooth technology, the other object may need to be within a Bluetooth communication range in order for the other object to be detected and a Bluetooth communication session to be established between user device 104 and the other object. As yet another example, if user device 104 enables wireless communication between user device 104 and the other object via Wi-Fi technology, the other object may need to be within a Wi-Fi communication range in order for the other object to be detected and a Wi-Fi communication session to be established between user device 104 and the other object.

Figure 2A:
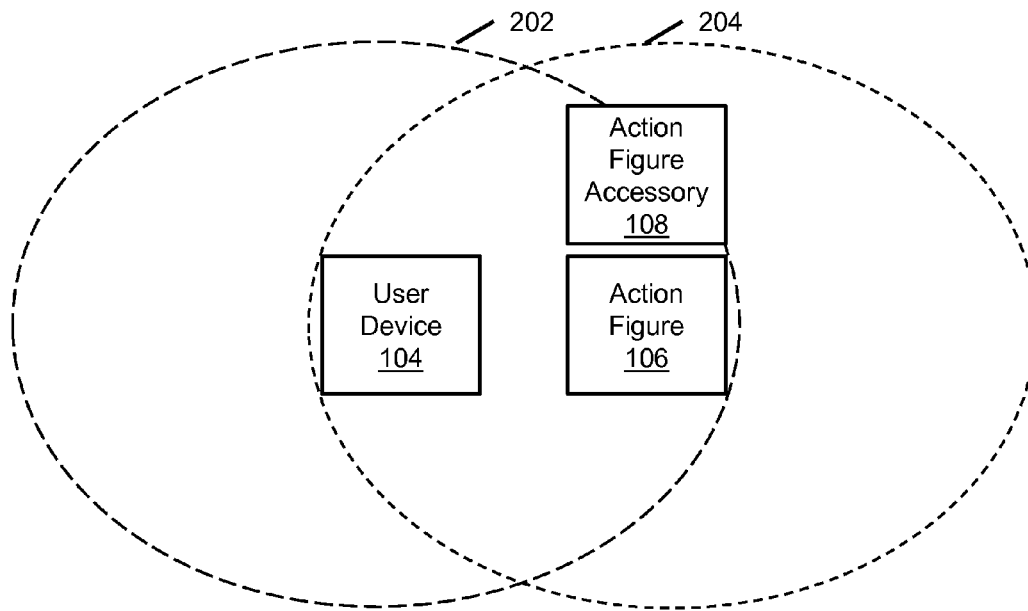
FIGS. 2A and 2B are exemplary illustrations of scenarios in which user devices, action figures, or action figure accessories communicate with one another via a short-range wireless connection, in accordance with aspects of the invention.

In one scenario, as shown in FIG. 2A, objects within area 202 may be within a wireless communication range of user device 104, and objects within area 204 may be within a wireless communication range of action FIG. 106. In the scenario of FIG. 2A, user device 104 and action FIG. 106 may establish a wireless connection with one another through which the two devices may directly communicate with one another. Additionally, or alternatively, user device 104 and accessory 108 may establish a wireless connection with one another through which the two devices may directly communicate with one another.

In another scenario, accessory 108 may provide information to user device 104 (or to a host of an associated virtual environment) by transmitting the information to action FIG. 106 via a wireless connection established between action FIG. 106 and accessory 108. Upon receipt of the information, action FIG. 106 may transmit the information to user device 104 via a wireless connection established between user device 104 and action FIG. 106. Accessory 108 may also receive information from user device 104 through action FIG. 106. In yet another other scenario, the roles of action FIG. 106 and accessory 108 may be swapped such that user device 104 and accessory 108 may be within each other's respective wireless communication ranges, and accessory 108 may relay information from action FIG. 106 to user device 104 or from user device 104 to action FIG. 106.

In yet another scenario, one or more action figures 106 may act as intermediaries between (i) one or more other action figures 106 (or their accessories 108) and (ii) user device 104 (or a host of an associated virtual environment). As an example, user device 104 may not support enough wireless connections at a given time. As such, one or more action figures 106 may act as intermediaries to limit the number of wireless connections with user device 104. If, for example, an "army" of action FIG. 106 is used during gameplay, one or more action figures 106 may act as intermediaries and establish wireless connections with user device 104 and other action figures 106. Thus, the receipt and transmission to/from the other action figures 106 may be performed through the intermediary action figures 106.

Figure 2B:
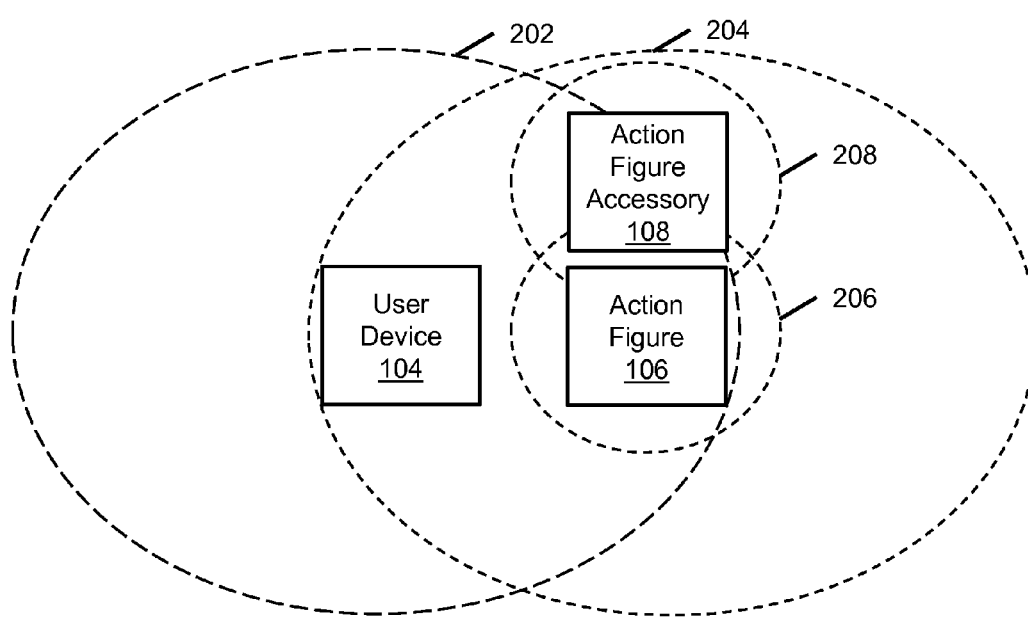

In a further scenario, with respect to FIG. 2B, area 202 may correspond to a Bluetooth communication range of user device 104, and area 204 may correspond to a Bluetooth communication range of action FIG. 106. Area 206 may correspond to an NFC communication range of action FIG. 106, and area 208 may correspond to an NFC communication range of accessory 108. As an example, user device 104 and action FIG. 106 may establish a Bluetooth communication session with one another through which the two devices may directly communicate with one another. Action FIG. 106 and accessory 108 may establish an NFC communication session with one another through which the two devices may directly communicate with one another.

It should be noted that, although some implementations described herein are with respect to wireless communications between one or more components of system 100, it is understood that (to the extent possible) communications between the components of system 100 may be performed via one or more wired means. For example, server 102, user device 104, action FIG. 106, accessory 108, or other components of system 100 may be directly connected to one another via a Universal Serial Bus (USB) connection, an Ethernet connection, or other wired means.

In an implementation, user device 104 may provide action figure or accessory information (received from one or more action figures or accessories) to virtual environment subsystem 112. Virtual environment subsystem 112 may generate a presentation of one or more virtual counterparts of the action figures or accessories in a virtual environment, and provide the presentation of the virtual counterparts and the virtual environment to user device 104. Responsive to receiving the presentation, user device 104 may provide the presentation of the virtual counterparts and the virtual environment to a user of user device 104 (e.g., via a display electronically coupled to user device 104, via a speaker electronically coupled to user device 104, or other output device).

Online Marketplace

In an implementation, user performance related to a virtual environment may be utilized to provide a targeted presentation of action figures, action figure accessories, or other items (e.g., services, products, etc.) available for purchase in an online marketplace. As an example, a user may utilize one or more virtual counterparts of action figures or action figure accessories to accomplish one or more objectives for the user in the virtual environment. User performance with respect to the objectives may be analyzed to generate performance indicator information associated with the user. The performance indicator information may then be utilized to select action figures, action figure accessories, or other items to be presented to the user for purchase.

In an implementation, the selected items (e.g., action figures, action figure accessories, etc.) or other items may be provided for sale in an online marketplace. The online marketplace may be continuously updated with new items for sale (e.g., as they become available for sale, as they become available for use with a virtual environment in which a virtual counterpart of the item exists, etc.). In an implementation, a digital store front accessible via a user device (e.g., residing on the user device, part of an application of the user device, etc.) may provide a user with access to the online marketplace, for example, enabling the user to browse items for sales (e.g., action figures, action figure accessories, etc.) and related information (e.g., pricing information, item details, etc.), purchase one or more items, view information related to fulfillment of orders, or perform other actions. As an example, with respect to FIG. 3, a user may be presented with the digital store front via user interface 302. As indicated, the digital store front may provide the user with a display of action figures or accessories that are available for sale (e.g., action figures 304a-304e, accessories 306a-306e, etc.), descriptions of the action figures or accessories, or other information.

In an implementation, upon purchase of an action figure or accessory, fulfillment of the purchase may be automated. As an example, responsive to an action figure or accessory being purchased by a user, online marketplace subsystem 122 may receive a purchase confirmation indicating that the action figure or accessory has been purchased by the user. Responsive to the purchase confirmation, online marketplace subsystem 122 may provide purchase order information to a vendor system (or other component of system 100) to prepare the action figure or accessory for delivery (e.g., packaging the action figure or accessory, creating the action figure or accessory, etc.), ship the action figure or accessory, or deliver the action figure or accessory. The purchase order information may comprise information identifying the purchased action figure or accessory, shipping information, billing information, or other information. In one use case, preparation of the action figure of accessory for shipment may comprise physical creation of the action figure or accessory. For example, responsive to the purchase confirmation, online marketplace subsystem 122 may provide instructions for creating the action figure or accessory to a 3D printing system, and a 3D printer of the 3D printing system may construct the action figure or accessory based on the provided instructions. In another use case, one or more of foregoing operations may be performed without human intervention between the operations. For example, no human input may be necessary from the time that the purchase confirmation is received to the time that the action figure or accessory is ready to be picked up for delivery to the user. Upon receipt of the purchase confirmation, for instance, online marketplace subsystem 122 may send the instructions to the 3D printing system. Upon creation of the action figure or accessory by the 3D printing system, one or more automated robots may be instructed (e.g., by online marketplace subsystem 122, the 3D printing system, or other component of system 100) to package the action figure or accessory for delivery (e.g., using purchase order information received from online marketplace subsystem).

In an implementation, virtual environment subsystem 112 may manage a virtual environment in which virtual counterparts of action figures interact with one another or the virtual environment. A virtual counterpart of an action figure may comprise a virtual character entity that represents the action figure in a virtual environment. A virtual counterpart of an accessory of the action figure may comprise a virtual accessory of the virtual character entity in the virtual environment.

In an implementation, online marketplace subsystem 122 may obtain performance indicator information related to performance of a user of a virtual environment (e.g., a virtual environment managed by virtual environment subsystem 112). Online marketplace subsystem 122 may select one or more of the action figures or accessories based on the performance indicator information, and present the selected action figures or accessories to the user in an online marketplace (e.g., within the virtual environment, via a third-party site, etc.).

The performance indicator information may identify one or more tasks completed by the user (e.g., tasks associated with a game, other tasks of the virtual environment, etc.), one or more tasks that have not been completed by the user, a percentage of completed/non-completed tasks related to an objective, one or more objectives achieved by the user, one or more objectives that have not been achieved by the user, a percentage of achieved/non-achieved objectives, one or more performance scores associated with tasks or objectives (e.g., based on how quickly the user performed the task or objective, how much damage was inflicted upon the virtual counterparts of the user's action figures or accessories while the user performed the task or objective, etc.), or other performance indicators.

As an example, when a user purchases an action figure or accessory, the user is generally able to utilize a virtual counterpart of the action figure or accessory in a virtual environment upon activation of the action figure or accessory (e.g., with a host of the virtual environment). However, in some scenarios, even if the user purchases and/or activates certain action figures or accessories, the virtual counterparts of those action figures or accessories may not be available for use by the user in the virtual environment until the user has satisfied certain conditions (e.g., satisfying certain objectives in the virtual environment or other conditions).

As such, in one scenario, an action figure or accessory may not be selected as a recommended sale item for the user based on a determination that the user has not satisfied certain conditions and that a virtual counterpart of the action figure or accessory is not available for use by the user in the virtual environment until those conditions have been satisfied. In another scenario, an action figure or accessory may be selected as a recommended sale item for the user based on a determination that the user has satisfied certain conditions and that a virtual counterpart of the action figure or accessory became available for use by the user in the virtual environment upon the user satisfying the conditions.

In an implementation, virtual counterpart information may be utilized to select one or more action figures or accessories as recommended items to be presented to a user. The virtual counterpart information may comprise information related to virtual counterparts of action figures or accessories assigned to a user, information related to virtual counterparts of action figures or accessories available for purchase, or other virtual counterpart information.

In an implementation, profile management subsystem 114 may determine one or more action figures or accessories assigned to a user (e.g., owned by the user, registered to the user, etc.). Virtual counterpart management subsystem 116 may obtain first virtual counterpart information related to one or more virtual counterparts of the action figures or accessories assigned to the user. As an example, the first virtual counterpart information may identify a first virtual counterpart of a first action figure or accessory assigned to the user, one or more enhancements obtainable by the first virtual counterpart, one or more conditions that are to be satisfied for the first virtual counterpart to obtain the enhancements, or other information. In one use case, the first virtual counterpart may obtain at least one of the enhancements when (i) certain other action figures or accessories are assigned to the user, or (ii) certain virtual counterparts (e.g., of the certain other action figures or accessories) or other virtual objects are assigned to the user. The enhancements may comprise (i) increased health, defense, or attack power for the first virtual counterpart, (ii) new abilities or special powers, (iii) access to areas of the virtual environment that the first virtual counterpart (or the user) previously could not access, or (iv) other enhancements. The conditions identified by the virtual counterpart information may comprise (i) the assignment of the certain other accessories to the user, (ii) the assignment of the certain virtual counterparts or other virtual objects to the user, or (iii) other conditions.

Inventory management subsystem 118 may obtain inventory information identifying one or more action figures or accessories available for purchase. Virtual counterpart management subsystem 116 may utilize the inventory information to obtain second virtual counterpart information related to one or more virtual counterparts of the available action figures or accessories. The second virtual counterpart information may, for example, identify one or more virtual counterparts of the available action figures or accessories that are assignable to the user upon purchase (or activation) of respective ones of the available action figures or accessories. Online marketplace subsystem 122 may select one or more of the available action figures or accessories as recommended items for the user based on (i) the first virtual counterpart information related to virtual counterparts assigned to the user and (ii) the second virtual counterpart information related to virtual counterparts of the available action figures or accessories.

The selection of action figures or accessories may, for example, be based on a determination of which of the available action figures or accessories (or their respective virtual counterparts), when assigned to the user, satisfy conditions for virtual counterparts assigned to the user to obtain certain enhancements (e.g., new abilities or special powers obtained upon satisfying conditions identified in the first virtual counterpart information). Table 1 below provides examples of enhancements obtainable by a virtual counterpart of an action figure and conditions that are to be satisfied for the virtual counterpart to obtain the enhancements.

TABLE 1

| Enhancement | Conditions to be Satisfied |
| --- | --- |
| 20% Bonus Health Increase for Virtual Character A | Must own Virtual Character Entities A, B, and C - Virtual Character Entity A automatically gets the 20% Bonus Health Increase when and for as long as a user owns all three character entities |
| 20% Bonus Attack Power Increase for Virtual Character A | Must own Virtual Character Entities A and B along with Virtual Character Entity B's Virtual Accessory B1 - Virtual Character Entity A automatically gets the 20% Bonus Attack Power Increase when and for as long as a user owns both character entities and Virtual Accessory B1 |
| 20% Bonus Maximum Ammo. for Virtual Character A's Virtual Accessory A1 | Must own Virtual Character Entities A and D along with Virtual Character Entity A's Virtual Accessory A1 - Virtual Accessory A1 is automatically enabled to store 20% more ammunition when and for as long as a user owns both character entities and Virtual Accessory A1 |

In one use case, with respect to Table 1 above, a user may already own a first action figure that corresponds to Virtual Character A and a second action figure that corresponds to Virtual Character B. As such, the user may own Virtual Characters A and B. A third action figure that corresponds to Virtual Character C may be selected as a recommended item for the user based on a determination that the addition of the third action figure (and, thus, Virtual Character C) to the user's collection will cause Virtual Character A to obtain the 20% Bonus Health Increase enhancement. In another use case, an accessory of the second action figure that corresponds to Virtual Accessory B1 may be selected as a recommended item for the user based on a determination that the addition of the accessory (and, thus, Virtual Accessory B1) to the user's collection will cause Virtual Character A to obtain the 20% Bonus Attack Power Increase enhancement.

In a further use case, with respect to Table 1 above, a user may already own a first action figure that corresponds to Virtual Character A and a first accessory that corresponds to Virtual Accessory A1. As such, the user may own Virtual Character A and Virtual Accessory A1. A second action figure that corresponds to Virtual Character D may be selected as a recommended item for the user based on a determination that the addition of the second action figure (and, thus, Virtual Character D) to the user's collection will cause Virtual Accessory A1 to obtain the ability to store 20% more ammunition (than it would without having the combination of the two action figures and the first accessory).

In an implementation, action figures or accessories may be selected as recommended items for a user of a virtual environment based on a determination of which action figures or accessories available for purchase (or their respective virtual counterparts), when assigned to the user, satisfy certain conditions for virtual counterparts assigned to the user to obtain certain enhancements (e.g., new abilities or special powers) related to achieving an objective of the user in the virtual environment. Table 2 below provides an example of an enhancement related to achieving an objective that is obtainable by a virtual counterpart of an action figure and conditions that are to be satisfied for the virtual counterpart to obtain the enhancement.

TABLE 2

| Enhancement | Conditions to be Satisfied |
| --- | --- |
| Enhanced Vision Ability for Virtual Character A - Enables Virtual Character A to see clearly on Smog Island to battle the Smog Monster that lives there | Must own Virtual Character Entities A, Y, and Z - Virtual Character Entity A automatically obtains the Enhanced Vision Ability when and for as long as a user owns all three character entities |

In one scenario, with respect to Table 2 above, a user may already own a first action figure that corresponds to Virtual Character A and a second action figure that corresponds to Virtual Character Y. As such, the user may own Virtual Characters A and Y. Performance indicator information associated with the user may indicate that the user has not yet achieved the objective of earning a "Monster" badge (e.g., which the user would earn upon defeating a threshold number of Monster "bosses" in the virtual environment). Based on the indication by the performance indicator information, an action figure or accessory may be selected if the action figure or accessory would help the user earn the Monster badge. As an example, a third action figure that corresponds to Virtual Character Z may be selected as a recommended item for the user based on a determination that the addition of the third action figure (and, thus, Virtual Character Z) to the user's collection will cause Virtual Character A to obtain the Enhanced Vision Ability. As described in Table 2 above, when Virtual Character A obtains the Enhanced Vision Ability, Virtual Character A is able to see clearly on Smog Island to battle the Smog Monster that lives on the island. Thus, obtaining the Enhanced Vision Ability for Virtual Character would help the user earn the Monster badge.

In an implementation, online marketplace subsystem 122 may compare action figures or accessories (or their corresponding virtual counterparts) with one another to determine which of the action figures or accessories available for purchase (or their corresponding virtual counterparts) would provide a user with a greater benefit. Based on such determination, online marketplace subsystem 122 may select one or more of the available action figures or accessories as recommended items to be presented to the user in an online marketplace. As an example, online marketplace subsystem 122 may select one or more action figures or accessories as recommended items based on the comparison indicating that virtual counterparts of the selected action figures or accessories provide greater benefit to the user with respect to achieving a particular objective than other ones of the virtual counterparts of the action figures or accessories available for purchase. In one scenario, for instance, it may be determined that a virtual counterpart in a user's current collection would obtain a first enhancement useful for achieving a current objective (e.g., currently assigned to the user to accomplish) if the user purchases and activates a first action figure or accessory (and, as a result, obtains a virtual counterpart of the first action figure or accessory). It may also be determined that a virtual counterpart in the user's current collection would obtain a second enhancement useful for achieving a future objective (e.g., not currently assigned to the user to accomplish) if the user purchases and activates a second action figure or accessory (and, as a result, obtains a virtual counterpart of the second action figure or accessory). Upon comparing the two benefits, online marketplace subsystem 122 may select the first action figure or accessory (over the second action figure or accessory) based on a determination that achieving the current objective is more beneficial to the user than achieving the future objective (e.g., the current objective may be given more priority/weight compared to the future objective).

Chance-Based Distribution of Multiple Versions of Action Figures or Accessories

In an implementation, a purchase of an action figure or accessory may comprise a chance-based purchase of a version of the action figure or accessory. In one use case, with respect to FIG. 3, a user may view (e.g., via a user interface 302) one or more recommendations of action figures or accessories (e.g., action figures 304a-304e, accessories 306a-306e, etc.) available for purchase along with corresponding descriptions of the action figures or accessories. As indicated in FIG. 3, each purchasable item presented to the user may comprise a chance to obtain a rare version of the item (e.g., a rare version of the action figure or accessory) that will allow the user to obtain a rare version of the virtual counterpart of the item. As an example, a rare version of an action figure or accessory may have physical characteristics (e.g., color, shape, or other characteristics) that are different from the physical characteristics of a common version of the action figure or accessory. The rare version of the action figure or accessory may also comprise digital parameter augmentations (e.g., an indicator stored in memory of the action figure or accessory to indicate that it is different from other versions) not available on common versions of the action figure or accessory.

With respect to FIG. 3, if the user purchases action FIG. 304a, one of multiple versions of action FIG. 304a (e.g., a common version, a rare version, etc.) may be randomly selected for delivery to the user to fulfill the user's purchase of action FIG. 304a. As indicated in FIG. 3, probabilities of a user obtaining particular versions of an action figure or accessory (upon purchase of the action figure or accessory) may be modified, for example, to encourage users to purchase action figures or accessories, to increase/decrease the rarity of particular versions of action figures or accessories, or for other reasons.

In an implementation, responsive to an action figure or accessory being purchased by a user, online marketplace subsystem 122 may receive a purchase confirmation indicating that the action figure or accessory has been purchased by the user. Responsive to the purchase confirmation, online marketplace subsystem 122 may provide a randomly-selected version of the action figure or accessory for delivery to the user. As an example, online marketplace subsystem 122 may randomly select the version of the action figure or accessory that is delivered to the user prior to the purchase confirmation, responsive to the purchase confirmation, etc.

Figure 4A:
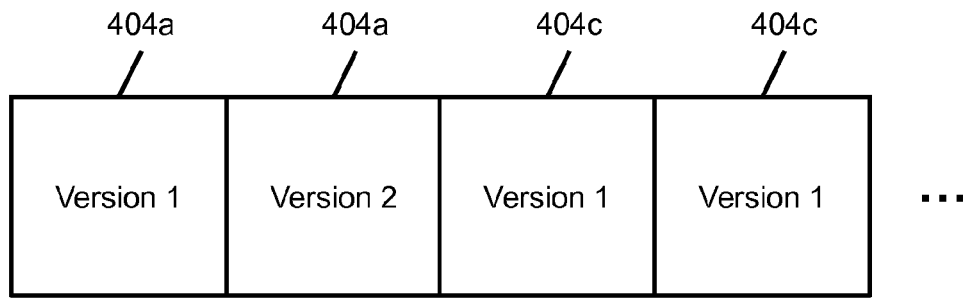
FIGS. 4A and 4B are exemplary illustrations of a queue used for chance-based distribution of multiple versions of action figures or action figure accessories, in accordance with an aspect of the invention.
Figure 4B:
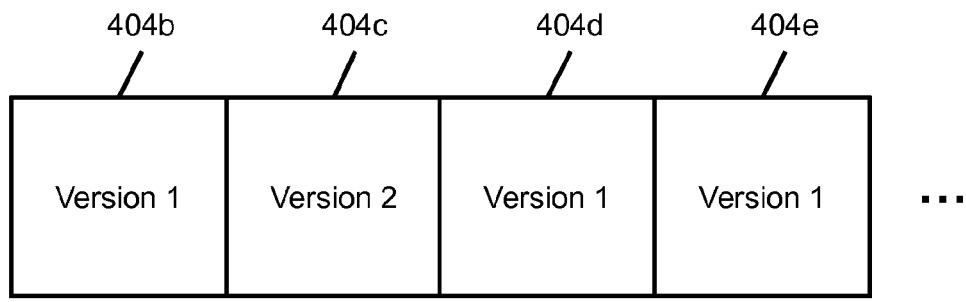

In one use case, instances of an action figure or accessory may be placed in a queue where each instance corresponds to one version of the action figure or accessory. An X number of the instances may correspond to one version of the action figure or accessory, a Y number of the instances may correspond to another version of the action figure or accessory, etc. The placement of the instances may, for example, be based on a random ordering of the instances. Once placed in the queue, purchase fulfillment of the action figure or accessory may be accomplished by providing versions of the action figure or accessory in accordance with the predefined random order. For example, with respect to FIG. 4A, instances of versions of an action figure or accessory may be randomly placed in queue 402 to facilitate the randomness in which versions of the action figure or accessory are to be provided to users upon purchase. When a user purchases the action figure or accessory, the version corresponding to the instance next in the queue (e.g., instance 404a) may be provided for delivery to the user (e.g., Version 1). FIG. 4B may, for example, illustrate the resulting queue 402 after the user purchases the action figure or accessory, where instance 404a is removed from the queue 402, and instance 404b is currently the instance next in the queue to be removed upon the next purchase of the action figure or accessory.

In another use case, a version of an action figure or accessory may be randomly selected for delivery to a user responsive to the user purchasing the action figure or accessory. As an example, when the action figure or accessory is purchased, version identifiers associated with versions of the action figure or accessory may be provided as parameters into a random number generator to obtain one of the version identifiers as a random output. The version of the action figure or accessory to be prepared for delivery to the user may be based on the version identifier that is provided as the random output (e.g., the action figure or accessory may be manufactured in accordance with the outputted version identifier, packaged in accordance with the outputted version identifier, etc.).

In an implementation, online marketplace subsystem 122 may assign probabilities to versions of an action figure or accessory that indicate the likelihood that respective ones of the action figure or accessory will be selected via random selection. As an example, a first probability may be assigned to a first version of the action figure or accessory, a second probability may be assigned to a second version of the action figure or accessory, and so on. One of the versions of the action figure or accessory may then be randomly selected based on the assigned probabilities. In one scenario, for example, when the action figure or accessory is purchased, version identifiers (associated with versions of the action figure or accessory) and their respective assigned probabilities may be provided as parameters into a random number generator to obtain one of the version identifiers as a random output. The version of the action figure or accessory to be prepared for delivery to the user may be based on the version identifier that is provided as the random output.

In an implementation, virtual counterpart management subsystem 116 may provide a virtual counterpart of a randomly-selected version of an action figure or accessory in a virtual environment. As an example, responsive to an action figure or accessory being purchased by a user and a random selection of a version of the action figure or accessory to be provided to the user, virtual counterpart management subsystem 116 may make available a virtual counterpart of the randomly-selected version of the action figure or accessory. As an example, an unpurchased action figure or accessory may be indicated in a database (e.g., a virtual counterpart database, an inventory database, etc.) as "invalid for activation." If a user attempts to activate an unpurchased action figure or accessory, the status of the unpurchased action figure or accessory may be queried at the database (e.g., using a unique identifier associated with the action figure or accessory), and a result indicating that the unpurchased action figure or accessory cannot be activated may be returned based on the "invalid for activation" status being associated with the unpurchased action figure or accessory.

As another example, responsive to an action figure or accessory being purchased by a user and a random selection of a version of the action figure or accessory to be provided to the user, virtual counterpart management subsystem 116 may modify the status of the purchased action figure or accessory as "ready to be activated." As such, when the user initiates activation of the action figure or accessory, the action figure or accessory may be activated based on the status of the action figure or accessory indicating that the action figure or accessory is enabled for activation. Responsive to the activation, virtual counterpart management subsystem 116 may assign a virtual counterpart of the random-selected version of the action figure or accessory to the user such that the virtual counterpart is available for use by the user in the virtual environment.

Related Aspects During Order Fulfillment

In an implementation, online marketplace subsystem 122 may receive a purchase confirmation indicating that an action figure or accessory has been purchased by a user. Based on the purchase confirmation, online marketplace subsystem 122 may work with virtual environment subsystem 112 to provide a temporary virtual object to the user such that the temporary virtual object is available for use by the user in a virtual environment. As an example, the temporary virtual object may comprise a virtual counterpart of the action figure or accessory in the virtual environment, a substitute for the virtual counterpart (e.g., a virtual substitute having one or more features similar to the features of the virtual counterpart), or other temporary virtual object.

Online marketplace subsystem 122 may receive order fulfillment information related to a delivery of the action figure or accessory. The order fulfillment information may comprise information identifying a current order fulfillment stage (e.g., order received, item created, item packaged, item shipped, item delivered, etc.), information identifying an estimate time remaining until a particular order fulfillment stage (e.g., an estimated time of delivery), information identifying a location of the action figure or accessory (e.g., a geographic location of the action figure or accessory, a location of the action figure or accessory relative to the delivery destination, etc.), or other information. Based on the order fulfillment information, online marketplace subsystem 122 may work with virtual environment subsystem 112 to assign a time of expiration such that use of the temporary virtual object by the user in the virtual environment is limited based on the time of expiration. As an example, virtual environment subsystem 112 may set use of the temporary virtual object to expire a predetermined amount of time after a time of delivery of the action figure or accessory (e.g., a month, a week, or other predetermined amount of time). When the time of expiration is reached, virtual environment subsystem 112 may deactivate the temporary virtual object or otherwise remove the ability for the user to utilize the temporary virtual object.

If the temporary virtual object comprises the virtual counterpart of the action figure or accessory, the "temporary" status of the virtual counterpart may be removed upon the user's activation of the action figure or accessory (e.g., by registering the action figure or accessory, using the action figure or accessory to access the virtual counterpart for the first time, etc.). If the temporary virtual object comprises a substitute for the virtual counterpart, the virtual counterpart may replace the substitute upon the user's activation of the action figure or accessory such that the virtual counterpart is available for use by the user in the virtual environment and the substitute is no longer available for use by the user in the virtual environment.

In an implementation, virtual environment subsystem 112 may present, in a virtual environment, an indication of progress of delivery of an action figure or accessory that has been purchased by a user. The presentation of the indication of the delivery progress may, for example, be based on order fulfillment information related to the delivery of the action figure or accessory, such as a current order fulfillment stage, an estimated time remaining until a particular order fulfillment stage, a location of the action figure or accessory, or other information.

Figure 5:
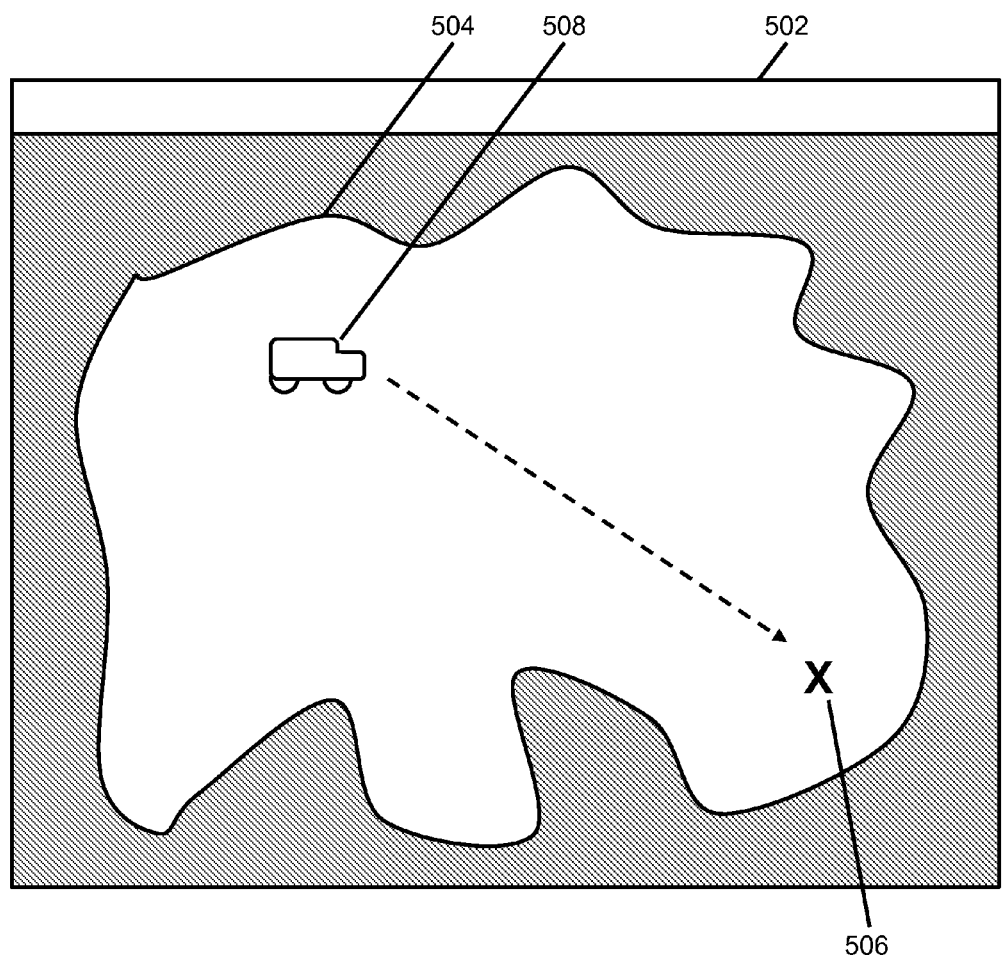
FIG. 5 is an exemplary illustration of a presentation of an indication of delivery progress of an action figure or action figure accessory, in accordance with an aspect of the invention.

In one use case, with respect to user interface 502 of FIG. 5, a presentation of an indication of progress of delivery of an action figure or accessory may comprise a presentation of a map of an island 504 on which a user's base 506 is located and a vehicle icon 508 representing a vehicle that is "delivering" a virtual counterpart of the action figure or accessory to the user's base 506. The position of the vehicle icon 508 on the map may be based on order fulfillment information related to the delivery of the action figure or accessory. For example, the current stage of the order fulfillment, the estimated time of arrival to a shipping destination provided by the user, or a current location of the action figure or accessory, or other information may be utilized to determine a position on the map at which to place vehicle icon 508 relative to the position of the user's base 506 on the map. As a further example, the position of the user's base on the map may be correlated with the shipping destination for the action figure or accessory, and the position of the vehicle icon 508 on the map may be correlated with the location of the action figure or accessory relative to the shipping destination.

In an implementation, virtual environment subsystem 112 may select a character entity (or other virtual object) in a virtual environment that is to provide an appearance of delivering or preparing for delivery of a virtual counterpart of an action figure or accessory (e.g., purchased by a user). An indication of progress of delivery of the action figure or accessory may be presented by providing a presentation of the selected character entity (or the selected virtual object) delivering or preparing for delivery of the virtual counterpart in the virtual environment. As an example, with respect to FIG. 5, vehicle icon 508 may represent a character entity that operates a particular vehicle as part of his persona in the virtual environment. Based on the selection of the character entity, vehicle icon 508 may be selected as the icon to depict to indicate the delivery progress of the action figure or accessory.

In an implementation, a location of a character entity (or other virtual object) delivering or preparing for delivery of a virtual counterpart of an action figure or accessory may be based on a level of progress of a delivery of the action figure or accessory. As an example, online marketplace subsystem 122 may receive order fulfillment information related to the delivery of the action figure or accessory. The order fulfillment information may indicate that the progress of the delivery of the action figure or accessory has reached a first level of progress. Based on the indication of the first level of progress, virtual environment subsystem 112 may present the character entity at a first location in a virtual environment that corresponds to the first level of progress. As a further example, online marketplace subsystem may receive updated order fulfillment information indicating that the progress of the delivery of the action figure or accessory has reached a second level of progress (e.g., greater than the first level of progress). Based on the indication of the second level of progress, virtual environment subsystem 112 may update the presentation of the character entity such that the character entity is presented at a second location in the virtual environment that corresponds to the second level of progress.

In one use case, with respect to FIG. 5, responsive to an action figure or accessory being confirmed as shipped (e.g., a first level of progress being reached), vehicle icon 508 may initially be presented at a first position on the map of island 504. Vehicle icon 508 may slowly move toward a second position corresponding to the user's base 506 in accordance with an estimated time remaining for delivery. Responsive to the action figure or accessory being confirmed as delivered (e.g., a second level of progress being reached), vehicle icon 508 may then be presented at the second position to indicate that the action figure or accessory has been delivered. Additionally, or alternatively, a virtual counterpart of the action figure or accessory may be provided to the user responsive to the delivery confirmation. As such, when vehicle icon 508 has reached the second position (corresponding to the user's base 506), use of the virtual counterpart in the virtual environment may be available to the user. Additional or alternative levels of progress may, of course, be utilized, including, for example, a transaction for a purchase order of the action figure or accessory being completed, creation of the action figure or accessory, the order being confirmed as shipped, arrival or departures at immediate locations at which the order shipment is processed, the order being confirmed as delivered, or other levels of progress.

In an implementation, a character entity (or other virtual object) delivering or preparing for delivery of a virtual counterpart of an action figure or accessory may be presented performing an activity based on a level of progress of a delivery of the action figure or accessory. As an example, online marketplace subsystem 122 may receive order fulfillment information related to the delivery of the action figure or accessory. Based on the order fulfillment information indicating that the delivery of the action figure or accessory has reached a first level of progress, virtual environment subsystem 112 may present the character entity performing a first activity in the virtual environment that corresponds to the first level of progress. As a further example, online marketplace subsystem 122 may receive updated order fulfillment information indicating that the progress of the delivery of the action figure or accessory has reached a second level of progress (e.g., greater than the first level of progress). Based on the indication of the second level of progress, virtual environment subsystem 112 may update the presentation of the character entity such that the character entity is presented performing a second activity in the virtual environment that corresponds to the second level of progress.

In one scenario, responsive to a transaction for a purchase order of an action figure or accessory being completed (e.g., a first level of progress being reached), a character entity (or other virtual object) may be presented obtaining a virtual counterpart of the action figure or accessory (e.g., creating, teleporting in, etc., the virtual counterpart) in a virtual environment. Responsive to the order being marked as shipped (e.g., a second level of progress), the character entity may be presented traveling en route (with the virtual counterpart) to the purchasing user's base in the virtual environment. Additional or alternative levels of progress may, of course, be utilized, including, for example, a transaction for a purchase order of the action figure or accessory being completed, creation of the action figure or accessory, the order being confirmed as shipped, arrival or departures at immediate locations at which the order shipment is processed, the order being confirmed as delivered, or other levels of progress.

In an implementation, a character entity (or other virtual object) in a virtual environment may be selected to provide an appearance of delivering or preparing for delivery of a virtual counterpart of an action figure or accessory to a user. The selection of the character entity may be based on a level of progress of a delivery of the action figure or accessory to the user. As an example, online marketplace subsystem 122 may receive order fulfillment information related to the delivery of the action figure or accessory. Based on the order fulfillment information indicating that the delivery of the action figure or accessory has reached a first level of progress, virtual environment subsystem 112 may select a first character entity that corresponds to the first level of progress for providing an appearance of delivering or preparing for delivery the virtual counterpart to the user. As a further example, online marketplace subsystem 122 may receive updated order fulfillment information indicating that the progress of the delivery of the action figure or accessory has reached a second level of progress (e.g., greater than the first level of progress). Based on the indication of the second level of progress, virtual environment subsystem 112 may select a second character entity (or other virtual object) that corresponds to the second level of progress for providing the appearance of delivering or preparing for delivery the virtual counterpart to the user.

In one scenario, responsive to a transaction for a purchase order of an action figure or accessory being completed (e.g., a first level of progress being reached), a first character entity (e.g., a builder) may be presented building a virtual counterpart of the action figure or accessory. Responsive to the order being marked as shipped (e.g., a second level of progress), a second character entity (e.g., a cargo transporter) may be presented traveling en route (with the virtual counterpart) to the purchasing user's base in the virtual environment. Additional or alternative levels of progress may, of course, be utilized, including, for example, a transaction for a purchase order of the action figure or accessory being completed, creation of the action figure or accessory, the order being confirmed as shipped, arrival or departures at immediate locations at which the order shipment is processed, the order being confirmed as delivered, or other levels of progress.

In an implementation, selection of a character entity (or other virtual object) to provide (to a user) an appearance of delivering or preparing for delivery of a virtual counterpart of an action figure or accessory may be based on an object type associated with the action figure or accessory. Online marketplace subsystem 122 may obtain information identifying a first action figure or accessory that has been purchased and a first object type associated with the first action figure or accessory, information identifying a second action figure or accessory that has been purchased and a second object type associated with the second action figure or accessory, and so on. Virtual environment subsystem 112 may select, based on the purchase of the first action figure or accessory and the first action figure or accessory being associated with the first object type, a first character entity from a plurality of character entities that is to provide an appearance of delivering or preparing for delivery a first virtual counterpart of the first action figure or accessory. Virtual environment subsystem 112 may select, based on the purchase of the second action figure or accessory and the second action figure or accessory being associated with the second object type, a second character entity from the plurality of character entities that is to provide an appearance of delivering or preparing for delivery a second virtual counterpart of the second action figure or accessory.

In a further implementation, virtual environment subsystem 112 may present an indication of a progress of a delivery of the first action figure or accessory by presenting, based on first order fulfillment information related to the delivery of the first action figure or accessory, the first character entity (or other virtual object) delivering or preparing for delivery of the first virtual counterpart. Virtual environment subsystem 112 may present an indication of a progress of a delivery of the second action figure or accessory by presenting, based on second order fulfillment information related to the delivery of the second action figure or accessory, the second character entity (or other virtual object) delivering or preparing for delivery of the second virtual counterpart. It should be noted that, although some implementations described herein are with respect to character entities being selected to provide an appearance of delivering or preparing for delivery of a virtual counterpart of an action figure or accessory in a virtual environment, other virtual objects may be selected in other implementations to provide an appearance of delivering or preparing for delivery of a virtual counterpart of an action figure or accessory in a virtual environment.

Exemplary Dataflow

Figure 6:
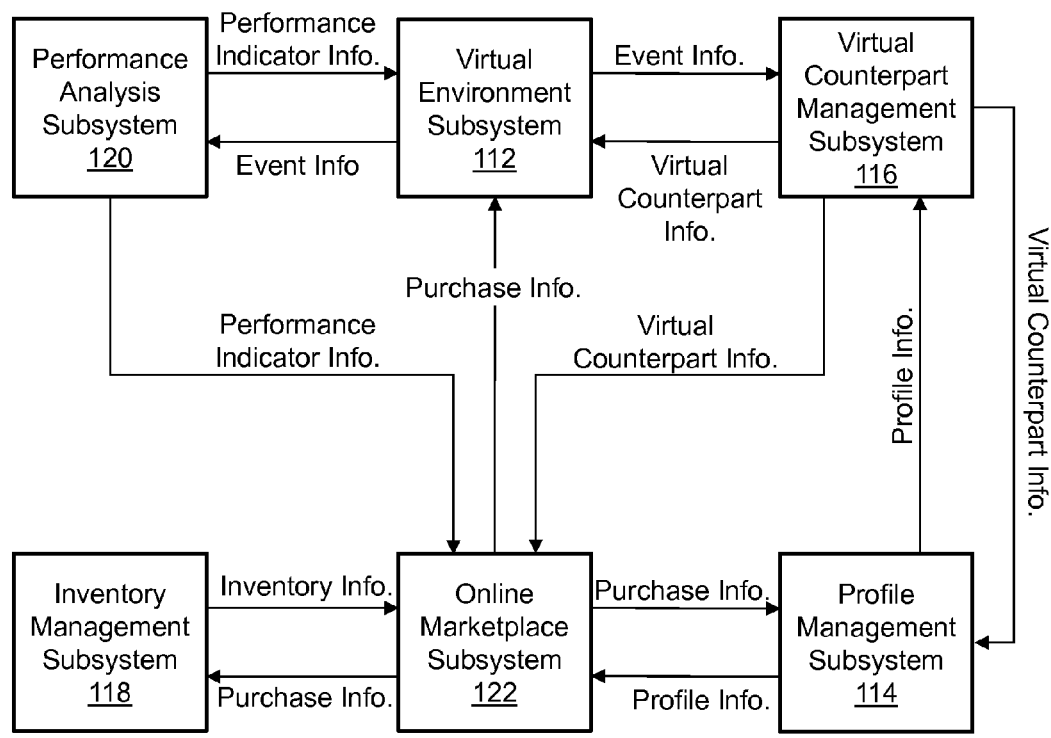
FIG. 6 is an exemplary illustration of a dataflow related to providing an enhanced marketing, sale, or order fulfillment experience related to action figures or action figure accessories that have corresponding virtual counterparts in a virtual environment, in accordance with an aspect of the invention.

FIG. 6 is an exemplary illustration of a dataflow related to providing an enhanced marketing, sale, or order fulfillment experience related to action figures or action figure accessories that have corresponding virtual counterparts in a virtual environment, in accordance with an aspect of the invention.

In an implementation, virtual environment subsystem 112 may provide event information associated with a user to performance analysis subsystem 120 for analysis to generate performance indicator information associated with the user. The event information may, for example, indicate user interactions of the user, actions of virtual counterparts of action figures or accessories assigned to the user, results of the actions of the virtual counterparts, actions taken against the virtual counterparts (e.g., by other virtual counterparts, other virtual objects, etc.), results of the actions taken against the virtual counterparts, or other events. Performance analysis subsystem 120 may provide the performance indicator information to virtual environment subsystem 112 so that a representation of the performance indicator information may be presented to the user (e.g., statistics regarding performance of the user, comparison of the user's performance with other performance of other users, etc.). Performance analysis subsystem 120 may alternatively or additionally provide performance indicator information associated with the user to online marketplace subsystem 122, which may utilize the performance indicator information to select one or more sale items that are to be presented to the user (e.g., action figures or accessories available for purchase). Online marketplace 122 may, for example, utilize the performance indicator information along with profile information associated with the user (e.g., information identifying the user, information identifying action figures or accessories assigned to the user, information identifying virtual counterparts of the action figures or accessories, etc.), inventory information associated with items available for purchase, or other information to select one or more items as recommended items for presentation to the user.

In an implementation, responsive to a purchase of an item, online marketplace subsystem 122 may provide purchase information related to the purchase of the item to inventory management subsystem 118 so that the inventory of items available for purchase may be updated. Online marketplace subsystem 122 may alternatively or additionally provide purchase information related to the purchase of the item to virtual environment subsystem 112. As an example, the purchase information may comprise order fulfillment information related to a delivery of the purchased item, and the purchased item may comprise an action figure or accessory. In one use case, virtual environment subsystem 112 may utilize the order fulfillment information to present an indication of progress of the delivery of the action figure or accessory in a virtual environment.

In an implementation, online marketplace subsystem 122 may provide purchase information related to a purchased item to profile management subsystem 114. As an example, the purchase information may identify the item, a user that purchased the item, a virtual counterpart of the item in a virtual environment, or other information. Profile management subsystem 114 may utilize the purchase information to update a profile of the user that purchased the item. As another example, the purchased item may comprise an action figure or accessory. Responsive to activation of the action figure or accessory by the user, online marketplace subsystem 122 may provide activation information indicating that the action figure or accessory has been activated to the profile management subsystem 114. Profile management subsystem 114 may utilize the activation information to update a profile of the user by assigning the action figure or accessory (and/or its corresponding virtual counterpart) to the user. Profile management subsystem 114 may provide the updated profile information to virtual counterpart management subsystem 116. Virtual counterpart management subsystem 116 may provide virtual counterpart information related to the user's virtual counterparts to profile management subsystem 114 so that the user's profile may be updated with the virtual counterpart information (e.g., details about a virtual counterpart of a newly-activated action figure or accessory, updates regarding the virtual counterparts in the user's collection, etc.).

In an implementation, virtual environment subsystem 112 may provide event information associated with a user to virtual counterpart management subsystem 116 so that information regarding virtual counterparts of action figures or accessories assigned to the user may be updated. As an example, the event information may comprise results of actions of virtual counterparts of action figures or accessories assigned to the user (e.g., gaining experience, new abilities, etc.), results of the actions taken against the virtual counterparts (e.g., loss of health points of the virtual counterparts due to damage), or other events. Virtual counterpart management subsystem 116 may update the information regarding the virtual counterparts based on the results or other event information.

Exemplary Flowcharts

FIGS. 7-10 comprise exemplary illustrations of flowcharts of processing operations of methods that enable the various features and functionality of the system as described in detail above. The processing operations of each method presented below are intended to be illustrative and non-limiting. In some implementations, for example, the methods may be accomplished with one or more additional operations not described, and/or without one or more of the operations discussed. Additionally, the order in which the processing operations of the methods are illustrated (and described below) is not intended to be limiting.

In some implementations, the methods may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of the methods in response to instructions stored electronically on an electronic storage medium. The one or more processing devices may include one or more devices configured through hardware, firmware, and/or software to be specifically designed for execution of one or more of the operations of the methods.

Figure 7:
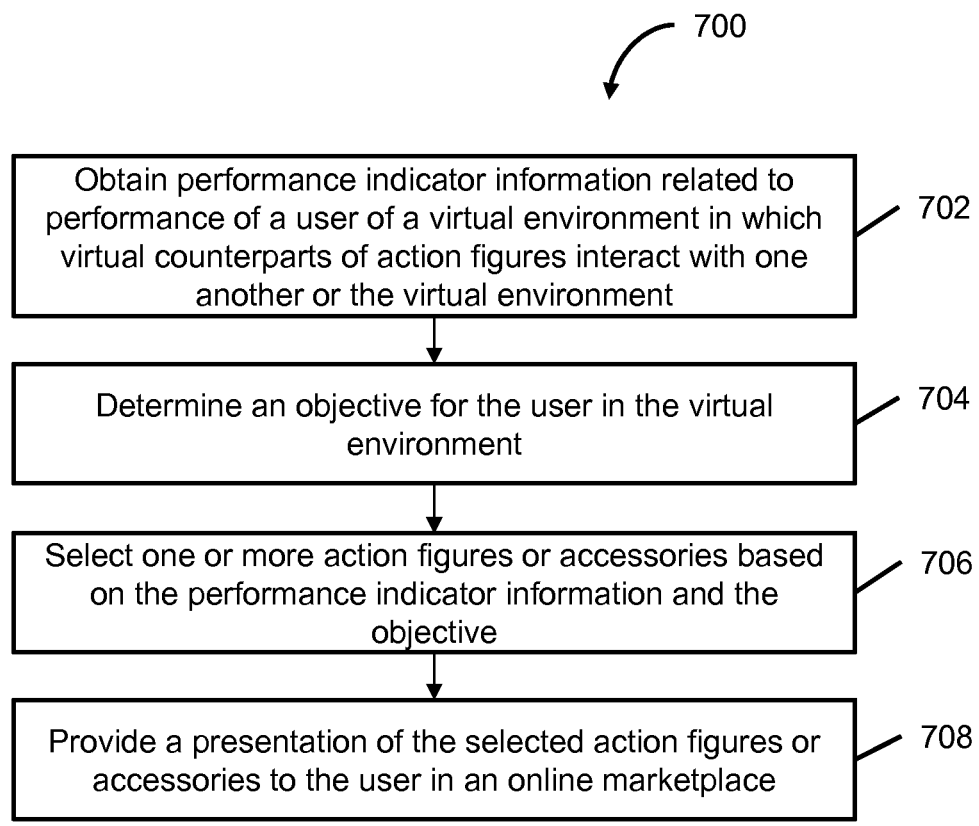
FIG. 7 is an exemplary illustration of a flowchart of a method of providing a targeted presentation of action figures or action figure accessories available for purchase based on user performance in a virtual environment, in accordance with an aspect of the invention.

FIG. 7 is an exemplary illustration of a flowchart of a method of providing a targeted presentation of action figures or action figure accessories available for purchase based on user performance in a virtual environment, in accordance with an aspect of the invention.

In an operation 702, performance indicator information related to performance of a user of a virtual environment may be obtained. The virtual environment may comprise an environment in which virtual counterparts of action figures interact with one another or the environment. Operation 702 may be performed by an online marketplace subsystem that is the same as or similar to online marketplace 122, in accordance with one or more implementations.

In an operation 704, an objective for the user in the virtual environment may be determined. Operation 704 may be performed by an online marketplace subsystem that is the same as or similar to online marketplace 122, in accordance with one or more implementations.

In an operation 706, one or more action figures or accessories may be selected based on the performance information and the objective. Operation 706 may be performed by an online marketplace subsystem that is the same as or similar to online marketplace 122, in accordance with one or more implementations.

In an operation 708, a presentation of the selected action figures or accessories may be provided to the user in an online marketplace. Operation 708 may be performed by an online marketplace subsystem that is the same as or similar to online marketplace 122, in accordance with one or more implementations.

Figure 8:
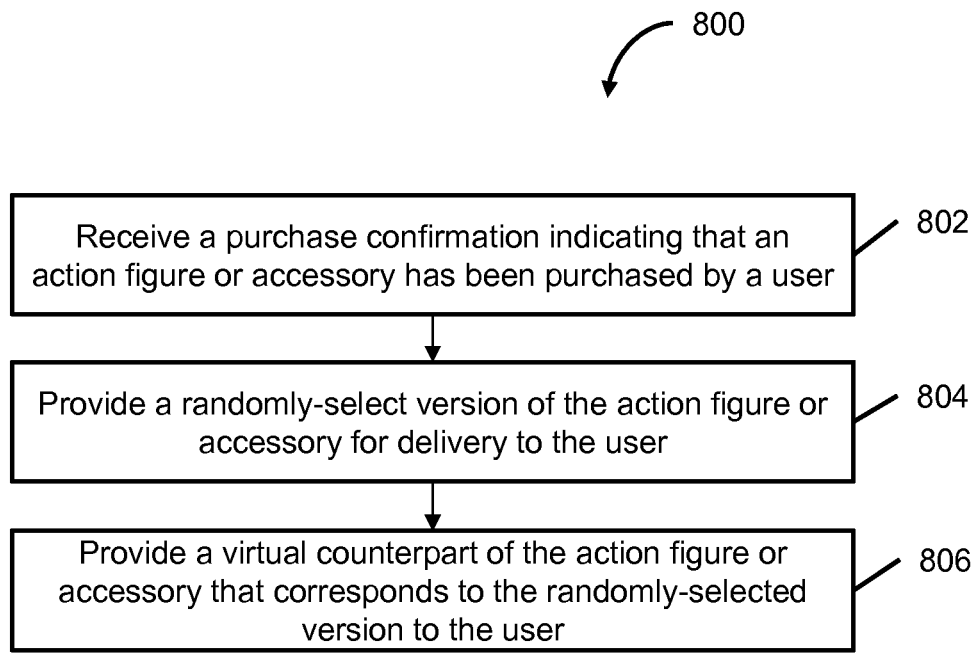
FIG. 8 is an exemplary illustration of a flowchart of a method of providing a randomly-selected virtual counterpart of an action figure or action figure accessory based on a purchase of the action figure or action figure accessory, in accordance with an aspect of the invention.

FIG. 8 is an exemplary illustration of a flowchart of a method of providing a randomly-selected virtual counterpart of an action figure or action figure accessory based on a purchase of the action figure or action figure accessory, in accordance with an aspect of the invention.

In an operation 802, a purchase confirmation indicating that an action figure or accessory has been purchased by a user may be received. Operation 802 may be performed by an online marketplace subsystem that is the same as or similar to online marketplace 122, in accordance with one or more implementations.

In an operation 804, a randomly-selected version of the action figure or accessory may be provided for delivery to the user. Operation 804 may be performed by an online marketplace subsystem that is the same as or similar to online marketplace 122, in accordance with one or more implementations.

In an operation 806, a virtual counterpart of the randomly-selected version of the action figure or accessory may be provided to the user. Responsive to the virtual counterpart being provided to the user, the user may utilize the virtual counterpart to interact with other users, other virtual counterparts, or the virtual environment. Operation 806 may be performed by a virtual environment subsystem that is the same as or similar to virtual environment subsystem 112, in accordance with one or more implementations.

Figure 9:
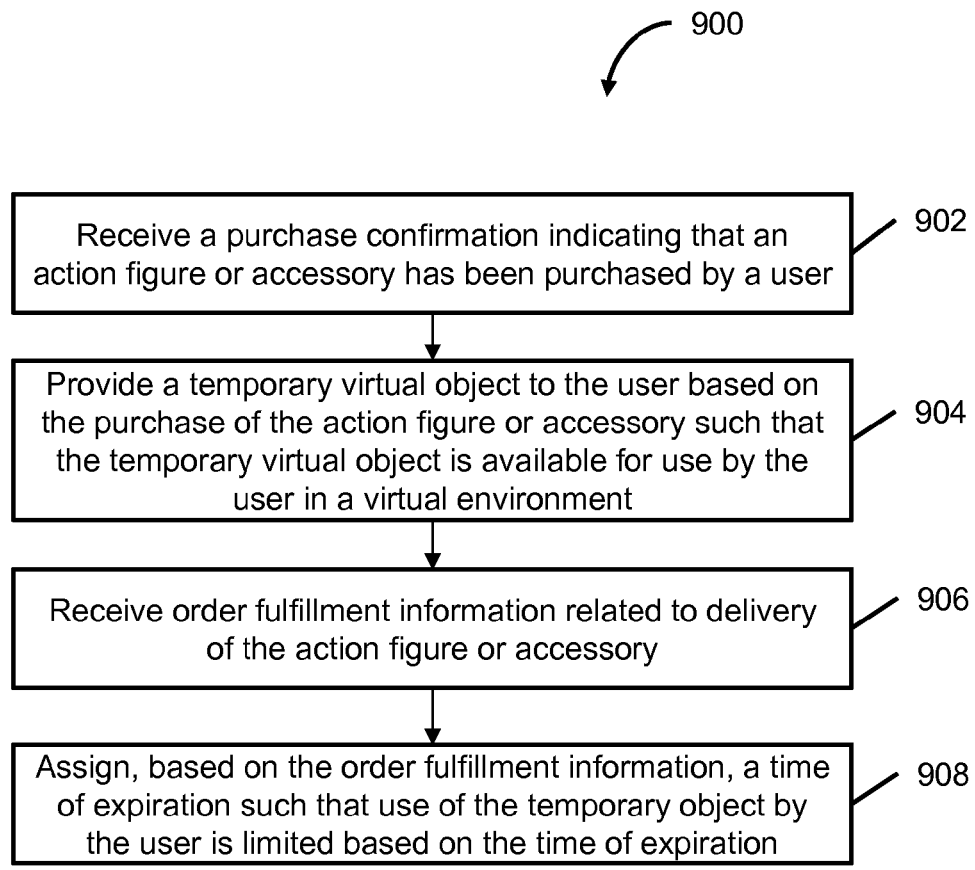
FIG. 9 is an exemplary illustration of a flowchart of a method of providing a related temporary virtual object for use in a virtual environment based on a purchase of an action figure or action figure accessory, in accordance with an aspect of the invention.

FIG. 9 is an exemplary illustration of a flowchart of a method of providing a related temporary virtual object for use in a virtual environment based on a purchase of an action figure or action figure accessory, in accordance with an aspect of the invention.

In an operation 902, a purchase confirmation indicating that an action figure or accessory has been purchased by a user may be received. Operation 902 may be performed by an online marketplace subsystem that is the same as or similar to online marketplace 122, in accordance with one or more implementations.

In an operation 904, a temporary virtual object may be provided to the user based on the purchase of the action figure or accessory such that the temporary virtual object is available for use by the user in the virtual environment. As an example, the temporary virtual object may comprise a virtual counterpart of the action figure or accessory, substitute for the virtual counterpart, or other temporary virtual object. Operation 904 may be performed by a virtual environment subsystem that is the same as or similar to virtual environment subsystem 112, in accordance with one or more implementations.

In an operation 906, order fulfillment information related to a delivery of the action figure or accessory may be received. Operation 906 may be performed by an online marketplace subsystem that is the same as or similar to online marketplace 122, in accordance with one or more implementations.

In an operation 908, a time of expiration may be assigned based on the order fulfillment information such that use of the temporary virtual object by the user is limited based on the time of expiration. Operation 908 may be performed by a virtual environment subsystem that is the same as or similar to virtual environment subsystem 112, in accordance with one or more implementations.

Figure 10:
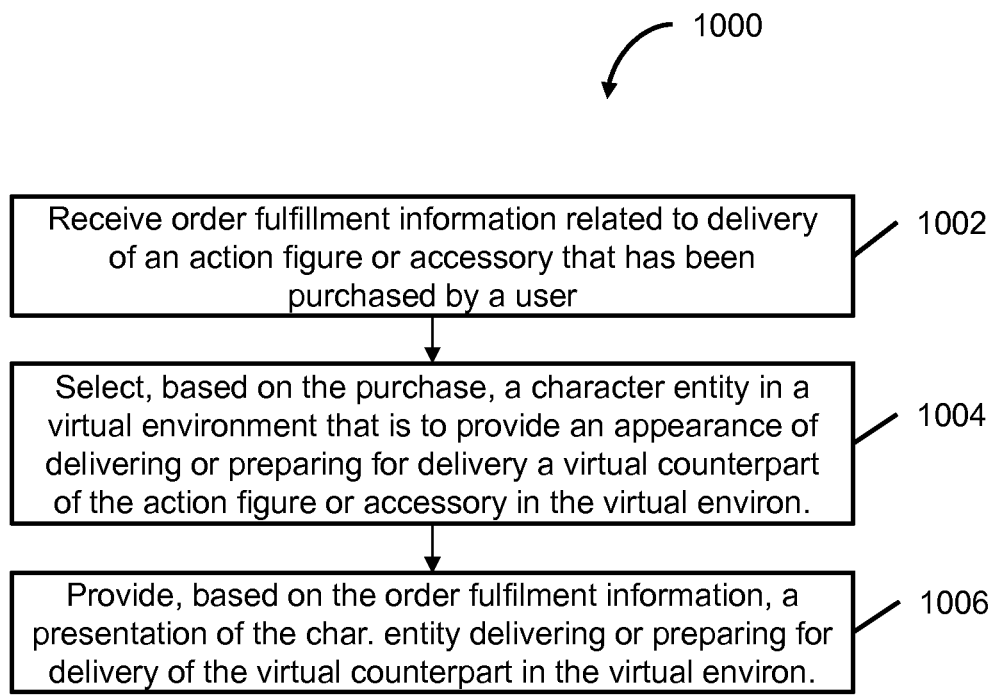
FIG. 10 is an exemplary illustration of a flowchart of a method of providing a presentation of a delivery of a virtual counterpart of an action figure or action figure accessory based on order fulfillment information related to a delivery of the action figure or action figure accessory, in accordance with an aspect of the invention.

FIG. 10 is an exemplary illustration of a flowchart of a method of providing a presentation of a delivery of a virtual counterpart of an action figure or action figure accessory based on order fulfillment information related to a delivery of the action figure or action figure accessory, in accordance with an aspect of the invention.

In an operation 1002, order fulfillment information related to a delivery of an action figure or accessory that has been purchased by a user may be received. Operation 1002 may be performed by an online marketplace subsystem that is the same as or similar to online marketplace 122, in accordance with one or more implementations.

In an operation 1004, a character entity in a virtual environment may be selected based on the purchase of the action figure or accessory to provide an appearance of delivering or preparing for delivery a virtual counterpart of the action figure or accessory in the virtual environment. Operation 1004 may be performed by a virtual environment subsystem that is the same as or similar to virtual environment subsystem 112, in accordance with one or more implementations.

In an operation 1006, a presentation of the character entity delivering or preparing for delivery of the virtual counterpart in the virtual environment may be provided based on the order fulfillment information. Operation 1006 may be performed by a virtual environment subsystem that is the same as or similar to virtual environment subsystem 112, in accordance with one or more implementations.

Although the present invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the scope of the appended claims. For example, it is to be understood that the present invention contemplates that, to the extent possible, one or more features of any implementation can be combined with one or more features of any other implementation.

What is claimed is:

1. A method of providing a targeted presentation of action figures or action figure accessories available for purchase in an online marketplace associated with a virtual environment, the presentation being based, in part, on user performance in the virtual environment in which virtual counterparts of the action figures or action figure accessories interact with one another, the method being implemented on a computer system that includes one or more physical processors executing computer program instructions, which when executed, perform the method, the method comprising:

obtaining, by the computer system, performance indicator information related to performance of a user of the virtual environment;

selecting, by the computer system, one or more of the action figures or action figure accessories based on the performance indicator information;

presenting, by the computer system, the one or more selected action figures or action figure accessories to the user in the online marketplace;

receiving, at the computer system, a purchase confirmation indicating that an action figure or action figure accessory has been purchased by the user;

providing, by the computer system, a temporary virtual object to the user based on the purchase of the action figure or action figure accessory such that the temporary virtual object is available for use by the user in the virtual environment, wherein the temporary virtual object comprises at least one of a virtual counterpart of the action figure or action figure accessory in the virtual environment or a substitute for the virtual counterpart;

receiving, at the computer system, order fulfillment information related to a delivery of the action figure or action figure accessory; and assigning, by the computer system, based on the order fulfillment information, a time of expiration such that use of the temporary virtual object by the user in the virtual environment is limited based on the time of expiration.

2. The method of claim 1, wherein the virtual counterparts of the action figures comprise virtual character entities that represent the action figures in the virtual environment, and the virtual counterparts of the action figure accessories comprises virtual accessories of the virtual character entities.

3. The method of claim 1, further comprising:

obtaining, by the computer system, virtual counterpart information related to a first virtual counterpart of a first action figure assigned to the user, wherein the virtual counterpart information identifies one or more enhancements that are obtained by the first virtual counterpart when at least one of: (i) at least a second action figure of the action figures or action figure accessories is assigned to the user; or (ii) at least a second virtual counterpart of the second action figure is assigned to the user, wherein selecting the one or more action figures or action figure accessories comprises selecting the second action figure further based on the virtual counterpart information, and wherein presenting the one or more selected action figures or action figures accessories comprises presenting the second action figure to the user in the online marketplace.

4. The method of claim 1, wherein the performance indicator information indicates a performance of the user with respect to an objective for the user in the virtual environment.

5. The method of claim 4, further comprising:

comparing, by the computer system, the virtual counterparts of the action figures or action figure accessories with one another, wherein selecting the one or more action figures or action figure accessories comprises selecting the one or more action figures or action figure accessories based on the comparison indicating that one or more virtual counterparts of the one or more action figures or action figure accessories provide greater benefit to the user with respect to achieving the objective than other ones of the virtual counterparts of the action figures or action figure accessories.

6. The method of claim 4, further comprising:
obtaining, by the computer system, virtual counterpart information related to a first virtual counterpart of a first action figure assigned to the user, wherein the virtual counterpart information identifies one or more enhancements that are obtained by the first virtual counterpart when at least one of: (i) at least a second action figure of the action figures or action figure accessories is assigned to the user; or (ii) at least a second virtual counterpart of the second action figure is assigned to the user;
determining, by the computer system, whether the one or more enhancements are related to achieving the objective; and
wherein selecting the one or more action figures or action figure accessories comprises selecting the second action figure based on a determination that the one or more enhancements are related to achieving the objective, and
wherein presenting the one or more selected action figures or action figures accessories comprises presenting the second action figure to the user in the online marketplace.

7. The method of claim 1, further comprising:
receiving, at the computer system, a purchase confirmation indicating that an action figure or action figure accessory has been purchased by the user;
providing, by the computer system, a randomly-selected version of the action figure or action figure accessory for delivery to the user, wherein the version of the action figure or action figure accessory is randomly selected from a plurality of versions of the action figure or action figure accessory; and
providing, by the computer system, a virtual counterpart of the randomly-selected version of the action figure or action figure accessory to the user in the virtual environment.

8. The method of claim 7, further comprising:
assigning, by the computer system, a first probability to a first version of the action figure or action figure accessory; and
assigning, by the computer system, a second probability to a second version of the action figure or action figure accessory,
wherein the random selection of the version of the action figure or action figure accessory comprises a random selection of one of the versions of the action figure or action figure accessory based on the first probability and the second probability.

9. The method of claim 1, further comprising:
receiving, at the computer system, order fulfillment information related to a delivery of an action figure or action figure accessory that has been purchased by the user; and
presenting, by the computer system, based on the order fulfillment information, an indication of progress of the delivery of the action figure or action figure accessory in the virtual environment.

10. The method of claim 9, further comprising:
selecting, by the computer system, based on the purchase of the action figure or action figure accessory, a first virtual object in the virtual environment that is to provide an appearance of delivering or preparing for delivery of a virtual counterpart of the action figure or action figure accessory,
wherein presenting the progress indication comprises presenting, based on the order fulfillment information, the first virtual object delivering or preparing for delivery of the virtual counterpart in the virtual environment.

11. The method of claim 10, wherein the order fulfillment information indicates that the progress of the delivery of the action figure or action figure accessory has reached a first level of progress, and wherein presenting the first virtual object comprises presenting, based on the order fulfillment information, the first virtual object such that the first virtual object is presented at a first location in the virtual environment corresponding to the first level of progress, the method further comprising:
receiving, at the computer system, updated order fulfillment information indicating that the progress of the delivery of the action figure or action figure accessory has reached a second level of progress; and
updating, by the computer system, based on the updated order fulfillment information, the presentation of the first virtual object such that the first virtual object is presented at a second location in the virtual environment corresponding to the second level of progress.

12. The method of claim 10, wherein the order fulfillment information indicates that the progress of the delivery of the action figure or action figure accessory has reached a first level of progress, and wherein presenting the first virtual object comprises presenting, based on the order fulfillment information, the first virtual object such that the first virtual object is presented performing a first activity in the virtual environment corresponding to the first level of progress, the method further comprising:
receiving, at the computer system, updated order fulfillment information indicating that the progress of the delivery of the action figure or action figure accessory has reached a second level of progress; and
updating, by the computer system, based on the updated order fulfillment information, the presentation of the first virtual object such that the first virtual object is presented performing a second activity in the virtual environment corresponding to the second level of progress.

13. The method of claim 9, wherein the order fulfillment information indicates that the progress of the delivery of the action figure or action figure accessory has reached a first level of progress, the method further comprising:
selecting, by the computer system, based on the order fulfillment information, a first virtual object in the virtual environment corresponding to the first level of progress that is to provide an appearance of delivering or preparing for delivery of a virtual counterpart of the action figure or action figure accessory, wherein presenting the progress indication comprises presenting the first virtual object delivering or preparing for delivery of the virtual counterpart in the virtual environment;
receiving, at the computer system, updated order fulfillment information indicating that the progress of the delivery of the action figure or action figure accessory has reached a second level of progress; and
selecting, by the computer system, based on the updated order fulfillment information, a second virtual object in the virtual environment corresponding to the second level of progress that is to provide an appearance of delivering or preparing for delivery of the virtual counterpart; and
presenting, by the computer system, the second virtual object delivering or preparing for delivery of the virtual counterpart in the virtual environment.

14. The method of claim 9, further comprising:
selecting, by the computer system, based on (i) the purchase of the action figure or action figure accessory and (ii) the action figure or action figure accessory being associated with a first object type, a first virtual object from a plurality of virtual objects that is to provide an appearance of delivering or preparing for delivery of a virtual counterpart of the action figure or action figure accessory, wherein presenting the progress indication comprises presenting, based on the order fulfillment information, the first virtual object delivering or preparing for delivery of the virtual counterpart in the virtual environment;

receiving, at the computer system, second order fulfillment information related to a delivery of a second action figure or action figure accessory purchased by the user;

selecting, by the computer system, based on (i) the purchase of the second action figure or action figure accessory and (ii) the second action figure or action figure accessory being associated with a second object type, a second virtual object from the plurality of virtual objects that is to provide an appearance of delivering or preparing for delivery of a second virtual counterpart of the second action figure or action figure accessory; and presenting, by the computer system, based on the second order fulfillment information, the second virtual object delivering or preparing for delivery of the second virtual counterpart in the virtual environment.

15. The method of claim 1, further comprising:
presenting, by the computer system, one or more other action figures or action figure accessories to the user in the online marketplace;
receiving, at the computer system, updated inventory information; and
presenting, by the computer system, based on the updated inventory information, one or more additional action figures or action figure accessories to the user in the online marketplace.

16. The method of claim 1, further comprising:
obtaining, by the computer system, pricing information indicating one or more prices for the one or more selected action figures or action figure accessories; and
presenting, by the computer system, the one or more prices with the presentation of the one or more selected action figures or action figure accessories in the online marketplace.

17. A system for providing a targeted presentation of action figures or action figure accessories available for purchase in an online marketplace associated with a virtual environment, the presentation being based, in part, on user performance in the virtual environment in which virtual counterparts of the action figures or action figure accessories interact with one another, the system comprising:
one or more physical processors programmed with computer program instructions, which when executed, cause the one or more physical processors to:
obtain performance indicator information related to performance of a user of the virtual environment;
select one or more of the action figures or action figure accessories based on the performance indicator information;
present the one or more selected action figures or action figure accessories to the user in the online marketplace;
receive a purchase confirmation indicating that an action figure or action figure accessory has been purchased by the user;
provide a temporary virtual object to the user based on the purchase of the action figure or action figure accessory such that the temporary virtual object is available for use by the user in the virtual environment, wherein the temporary virtual object comprises at least one of a virtual counterpart of the action figure or action figure accessory in the virtual environment or a substitute for the virtual counterpart;
receive order fulfillment information related to a delivery of the action figure or action figure accessory; and
assign based on the order fulfillment information, a time of expiration such that use of the temporary virtual object by the user in the virtual environment is limited based on the time of expiration.

18. The system of claim 17, wherein the virtual counterparts of the action figures comprise virtual character entities that represent the action figures in the virtual environment, and the virtual counterparts of the action figure accessories comprises virtual accessories of the virtual character entities.

19. The system of claim 17, wherein the one or more physical processors are further caused to:
obtain virtual counterpart information related to a first virtual counterpart of a first action figure assigned to the user, wherein the virtual counterpart information identifies one or more enhancements that are obtained by the first virtual counterpart when at least one of: (i) at least a second action figure of the action figures or action figure accessories is assigned to the user; or (ii) at least a second virtual counterpart of the second action figure is assigned to the user,
wherein selecting the one or more action figures or action figure accessories comprises selecting the second action figure further based on the virtual counterpart information, and
wherein presenting the one or more selected action figures or action figures accessories comprises presenting the second action figure to the user in the online marketplace.

20. The system of claim 17, wherein the performance indicator information indicates a performance of the user with respect to an objective for the user in the virtual environment.

21. The system of claim 20, wherein the one or more physical processors are further caused to:
compare the virtual counterparts of the action figures or action figure accessories with one another,
wherein selecting the one or more action figures or action figure accessories comprises selecting the one or more action figures or action figure accessories based on the comparison indicating that one or more virtual counterparts of the one or more action figures or action figure accessories provide greater benefit to the user with respect to achieving the objective than other ones of the virtual counterparts of the action figures or action figure accessories.

* * * * *